United States Patent [19]  
Watanabe et al.

[11] 4,014,766  
[45] Mar. 29, 1977

[54] ELECTROLYTIC TREATMENT OF WASTE WATER

[75] Inventors: Yoshihisa Watanabe; Naohiro Nojiri, both of Amimachi, Japan

[73] Assignee: Mitsubishi Petrochemical Company Limited, Japan

[22] Filed: Oct. 23, 1975

[21] Appl. No.: 625,099

[30] Foreign Application Priority Data

Oct. 28, 1974 Japan .............................. 49-124145  
June 18, 1975 Japan .............................. 50-73106  
June 18, 1975 Japan .............................. 50-73107

[52] U.S. Cl. .................................. 204/152; 204/89; 204/97; 204/130; 204/149; 204/283
[51] Int. Cl.² ........................ C02C 5/12; C25C 1/10
[58] Field of Search ................. 204/86, 91, 97, 114, 204/130, 149, 152, 283

[56] References Cited  
UNITED STATES PATENTS

| 578,171 | 3/1897 | Turner | 204/283 |
| 857,277 | 6/1907 | Harris | 204/152 |
| 3,223,611 | 12/1965 | Wells et al. | 204/283 X |
| 3,300,396 | 1/1967 | Walker | 204/283 X |
| 3,458,434 | 7/1969 | Peter | 204/149 X |
| 3,679,557 | 7/1972 | Gilby et al. | 204/152 X |
| 3,755,114 | 8/1973 | Tarjanyi et al. | 204/114 |
| 3,761,383 | 9/1973 | Backhurst et al. | 204/95 X |

Primary Examiner—Arthur C. Prescott  
Attorney, Agent, or Firm—Robert E. Burns; Emmanuel J. Lobato; Bruce L. Adams

[57] ABSTRACT

Waste water is subjected to electrolysis in an electrolytic cell having an anode comprising an insoluble central electrode and a body of particulate iron pieces disposed therearound and in electrical contact therewith, whereby impurities in the waste water become occluded within a floc of iron hydroxide formed by electrolytic dissolution of the iron pieces, and the floc containing the impurities is subjected to oxidation processing and is thereafter separated. A magnetic field can be applied to the waste water thus treated thereby to promote sedimentation of the floc.

13 Claims, 2 Drawing Figures

ELECTROLYTIC TREATMENT OF WASTE WATER

BACKGROUND OF THE INVENTION

This invention relates to a waste water treatment method and electrolytic apparatus for practicing the method by which impurities in water, particularly heavy metal ions, organic materials, suspended substances, silica, coloring matter, and like impurities contained in water for industrial use and industrial waste water are electrolytically separated and removed.

In a waste water treatment method of this kind depending on electrolytic separation means known heretofore, treated water is obtained by causing the impurities within the waste water to be caught in a floc of a metal hydroxide formed by the dissolution of the anode metal in the form of an aluminum plate or an iron plate and separating the impurities by causing the floc to settle or sediment under the force of gravity. By this method, however, the floc is of a small size and requires a long settling time in the gravity settling step. Moreover, the sedimentation volume is large and the water content of the sediment or sludge is high. Accordingly, it takes time to desiccate the sludge.

In this known electrolytic treatment method, furthermore, the power efficiency drops after the long operation because of the formation of oxide film on or adhesion of scales to the anode. Still another problem is that the anode falls off before it is completely consumed and is therefore not effectively utilized.

SUMMARY OF THE INVENTION

It is an object of this invention to solve the above described problems accompanying prior waste water treatment techniques.

Another and more specific object of the invention is to provide a method of electrolytically treating waste water wherein a floc which is readily aggregated and has a low water content is formed.

This object and other related objects as will become apparent from the description set forth hereinafter have been achieved by this invention, according to which in its broadest aspect, briefly summarized, there is provided, in the treatment of waste water wherein waste water is subjected to electrolysis with an iron anode thereby to cause impurities in the waste water to aggregate within a floc resulting from the formation of iron hydroxide by electrolytic dissolution of the anode, and the floc containing the impurities is separated from the waste water, the improvement wherein the iron anode comprises an insoluble electrode material and a body of iron pieces in electrical contact therewith, and the floc containing the impurities is subjected to oxidation and thus separated.

Still another object of the invention is to provide a method whereby waste water containing hexavalent chromium ions is electrolytically treated and the hexavalent chromium ions are thereby transformed into trivalent chromium ions.

This object has been achieved by this invention, according to which is another aspect thereof, there is provided a method of treating waste water containing hexavalent chromium ions which comprises subjecting the waste water to electrolysis with an iron anode thereby to reduce the hexavalent chromium ions to a chromium of lower valence and, at the same time, to cause this chromium of lower valence to be caught by a hydroxide of iron formed from the anode by the electrolysis and separating the resulting floc containing the chromium from the waste water, the method being characterized in that the iron anode comprises an insoluble electrode and a body of iron pieces in electrical contact therewith.

A further object of the invention is to provide apparatus for practicing the electrolytic waste water treatment method as described above.

This object has been achieved by this invention, according to which in another important aspect thereof, there is provided a waste water treatment apparatus characterized by the combination therein of an electrolytic cell comprising a cell vessel for accommodating waste water as an electrolyte, a cathode, and an anode characterized in that it is made up of an electrode material which is insoluble under electrolytic conditions and a body of iron pieces in electrical contact with the electrode material, and a perforated material having perforations of a nature whereby it will pass ions but not the iron pieces therethrough and remaining intact under electrolysis, the iron pieces being confined within a chamber defined by the perforated material, the total surface area of the body of iron pieces being at least 0.5 $cm^2$/milliliter with respect to the actual volumetric capacity of the cell vessel, the electrolytic cell operating to electrolyze the waste water thereby to cause impurities in the waste water to aggregate within a floc resulting from the formation of iron hydroxide by electrolytic dissolution of the anode.

According to this invention in a further aspect thereof, there is provided a waste water treatment apparatus as set forth above which further has a sedimentation tank for receiving electrolytically treated waste water from the cell vessel and functioning to separate this waste water into treated liquid and a sediment.

According to this invention in still another aspect thereof, there is provided a waste water treatment apparatus as set forth above which further has means for applying a magnetic field to the electrolytically treated waste water in the flowpath thereof from the electrolytic cell to the sedimentation tank or in the bottom of the sedimentation tank thereby to promote the formation of sediment therein.

The nature, utility, and further features of this invention will be apparent from the following detailed description beginning with a consideration of general aspects of the invention and concluding with specific examples of practice illustrating preferred embodiments of the invention and comparison examples.

DETAILED DESCRIPTION

Figure 1:
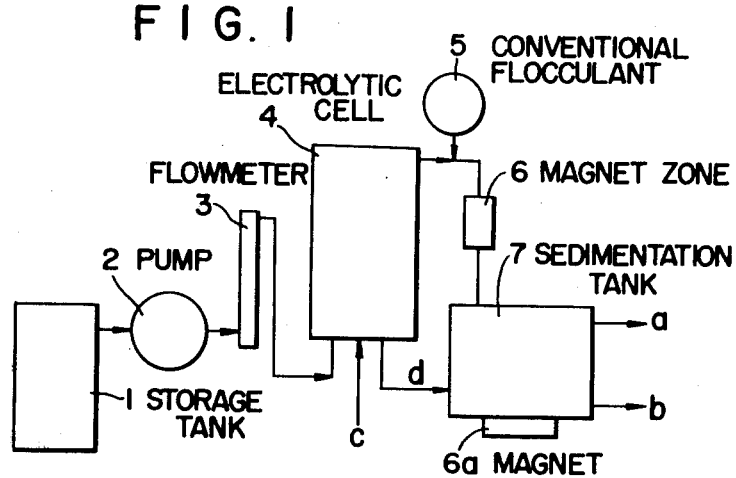
FIG. 1 is a flow-sheet diagram showing the general arrangement of one example of apparatus indicating the principle of the treatment method according to the invention.

The most important feature of this invention lies in the construction of the iron anode used therein. More specifically, the iron anode used in the method and apparatus of the invention comprises an insoluble electrode material and a body or aggregate of iron pieces in electrical contact therewith.

Examples of materials which can be used for the insoluble electrode material in the practice of this invention are platinum, ferrite, and carbon.

For an auxiliary electrode material comprising the aggregate of iron "pieces" to be charged in a state of electrical contact with the insoluble electrode to make up the iron anode, iron powder, iron turnings, iron chips, iron particles, and like iron pieces of lengths of from 1 micron to 30 cm. can be used. Iron turnings of lengths of the order of from 0.5 to 20 mm. are particularly desirable because of their low price and because their use would be utilization of waste material.

The quantity of the iron pieces to be charged to form the auxiliary electrode material is such that the total surface area of the iron pieces relative to the actual volumetric capacity of the electrolytic cell will be at least 0.5 cm$^2$/ml., preferably more than 1 cm.$^2$/ml., and particularly preferably more than 1.5 cm$^2$/ml.

Here, the term "actual volumetric capacity" is that part of the interior volume of the electrolytic cell which, when waste water is supplied into the cell, takes part in the electrolytic process.

When, during the electrolytic treatment, the total surface area of the iron pieces becomes less than 0.5 cm.$^2$/ml., particularly less than 1 cm.$^2$/ml., iron pieces are newly charged into the electrolytic cell for replenishment.

For reference, in an electrolytic treatment cell employing a conventional iron or aluminum plate for the anode, the electrode area relative to the actual volumetric capacity is ordinarily of the order of from 0.05 to 0.4 cm.$^2$/ml.

The expression "the insoluble electrode and the iron pieces of the auxiliary electrode are in electrical contact" is herein used to designate a state wherein the iron pieces are in direct contact with the insoluble electrode, or other iron pieces are in contact with the iron pieces which contact the insoluble electrode and are thereby is electrical contact.

Furthermore, although the state wherein the iron pieces are agitated by mechanical agitation, water flow, and gas bubbling and contact the insoluble electrode from time to time is also included, a packed structure of the iron pieces wherein the insoluble electrode and the iron pieces of the auxiliary electrode are continually and continuously in contact is desirable. Even in a packed structure of this character, a considerable amount of voids are present between the iron pieces depending on the shapes and sizes of the iron pieces. For example, in the case where iron turnings are packed, the void percentage may be as high as of the order of 90 percent.

For the purpose of holding the aggregate of iron pieces of the auxiliary electrode material around the insoluble anode material and preventing the iron pieces from contact with the cathode, the two electrodes are separated. As means for this separation, that is, a diaphragm, a material which will remain intact against electrolysis, as, for example, a synthetic resin such as nylon, polyethylene, or polyester; a ceramic material such as alumina, or biscuits; or asbestos or an ion-exchange membrane ordinarily used for electrolysis is used. These materials can be used in the form of "sheet" or "plate" such as a net, a woven fabric, a sheet in a grid-like state, a perforated sheet, or like form, which can be selected in accordance with factors such as the operational scale and strength of the material. The sheet of these material is fabricated into a shape for housing or accomodating the aggregate of iron pieces therein with an integrate or nonintegrate bottom plate.

This "diaphragm" must possess perforations of a nature such that it will pass ions but will not pass the iron pieces. Since the iron pieces dissolve and become smaller in size as the electrolysis progresses, it is desirable that the size of the perforations of the diaphragm be sufficiently small in order that the diaphragm may retain the iron pieces therewithin over a long time. A preferable size of the perforations, considered to be circular, is of the order of from 1 micron to 20 mm. in diameter.

While this diaphragm may be designed in accordance with the shape and construction of the cathode to be combined therewith to be of any shape and construction such as to prevent the iron pieces from contacting the cathode, it is preferably of a character such that it will form a chamber for accommodating the insoluble anode material and the aggregate of iron pieces surrounding the anode material. The volumetric capacity of this chamber may be of an order such that the iron pieces to be accommodated therein will be packed densely so that they cannot shift relative to each other or of an order such the iron pieces will be free to shift relative to each other.

The specific shape of the anode member determined by this diaphragm, particularly that in relation to the cathode which is the counter electrode thereof, may be selected at will, with the following points being taken into consideration. One purpose of an electrolytic treatment of this character for waste water is to subject the waste water itself to electrolysis thereby to convert impurities in dissolved state therein which can be electrolytically reduced or oxidized into another form. In addition, another purpose is to cause the impurities in the waste water to be occluded by a floc of iron hydroxide formed from the iron anode by the electrolysis and to be thus removed.

For example, for the purpose of reduction or oxidation of dissolved ions, the anode member of this invention can be considered to be the same as an ordinary anode and can be combined with a cathode to carry out the desired electrolytic reaction in the space therebetween. However, the distance between the two electrodes, that is, the distance between the cathode and the diaphragm which is a material constituting the surface of the anode member of this invention, is preferably made amply small so as to reduce the required electrical energy.

Accordingly, the anode member of this invention is preferably of a construction such that it is of amply large volume and the material constituting its outer side, i.e., the diaphragm, is positioned with ample proximity relative to the cathode (being in contact therewith in the extreme case). Since the diaphragm is permeable to ions in this case, an electrochemical reaction of dissolved ions takes place in the chamber defined by the diaphragm, that is, in the voids between the iron pieces charged into this chamber.

In this case, furthermore, the aforementioned other objective action of this electrolytic treatment of waste water, that is, the forming of iron hydroxide floc and the occlusion thereby of impurities, also takes place in the voids between the iron pieces. For this purpose, the voidage or percentage of voids between the iron pieces, namely the percentage of voids relative to the apparent or bulk volume of the body of the iron pieces, is preferably of the order of from 50 to 99 percent, which can be attained by appropriately selecting the shapes and sizes of the iron pieces.

An anode member and a cathode of the above described desirable features have a structural arrangement wherein, as described more fully hereinafter, the iron anode is formed by providing an insoluble electrode member in the center of a diaphragm of hollow cylindrical shape and filling the space between this insoluble electrode member and the diaphragm with the iron pieces and is accommodated within a hollow cylindrical cathode structure thereby to form an electrode pair. This electrode assembly is installed in the vessel of an electrolytic cell with the axis of the cylindrical structure in vertical position, and the waste water to be treated is introduced into this vessel through the bottom thereof. It is necessary to close the bottom part of the anode member with a perforated bottom plate (which may made of the same material as the diaphragm) with perforations of a nature such as to prevent dropping of the iron pieces therethrough yet permitting free passage therethrough of the waste water, but the upper part of the anode member may be open.

The cathode to be the counter electrode of this anode is ordinarily made of a material such as copper, ferrite, or iron, but it may be made of the same material as the aforementioned insoluble electrode material. If desirable, the vessel of the electrolytic cell can be made of a metal and utilized as the cathode.

By using an iron anode of the above described character, the following advantages are afforded in this invention.

a. For the consumable electrode, inexpensive iron pieces can be used and, moreover, can be utilized with 100 percent effectiveness.
b. There is no necessity of replacing the anode as in the conventional electrolysis method, and, by automatically replenishing the iron pieces, waste water can be treated continuously over a long time.
c. Since small iron pieces are used, the electrode surface area per unit of actual volumetric capacity of the electrolytic cell is very large, and the current efficiency is improved, whereby the waste water can be treated with low electrical energy and in a short time. Furthermore, this feature makes possible reduction of the size of the electrolytic apparatus.
d. Since the dissolution of iron is carried out from an extensive surface, the dissolved and formed iron ions efficiently intercept impurities. Impurities particularly of low concentrations are also efficiently removed.

Another important feature of this invention is that, with the use of an iron anode of the above described construction, an iron hydroxide floc is formed and subjected to an oxidation process thereby to form a magnetic iron compound within this floc.

The process of oxidizing the floc in this invention is accomplished by causing the floc to contact an oxidizing agent such as, for example, molecular oxygen. More specifically, this oxidation can be accomplished by a method such as blowing air into the floc, agitating the floc in an atmosphere of an oxidizing gas such as air or oxygen, or adding to the floc an oxidizing agent such as sodium hypochlorite. Since electrolytically dissolved iron ions instantaneously form a magnetic iron compound, the separation of the sludge is facilitated. While the most desirable oxidation method is that of bubbling air into the electrolytic bath, this method produces particularly desirable results when the iron pieces of the anode are in a relatively loosely, packed state within the diaphragm chamber since agitation of these iron pieces also takes place.

By carrying out oxidation treatment in this manner during or after the electrolysis, the settling speed of the formed floc becomes high, and the separation of the sludge is facilitated and made rapid.

More specifically, the sedimentation volume of the floc of the magnetic iron compound formed by oxidation processing is from 1/5 to 1/10 of that of a ferrous sludge obtained by a conventional electrolysis method or chemical method, and the sedimentation speed of the floc is from 1/50 to 1/60 when magnetic force is applied to the magnetic iron compound. The water content also decreases to a small fraction, and the sedimentation characteristic improves, whereby sludge separation, dehydration, and other steps are greatly facilitated. For this reason, economical features such as reduction of the size of the settling vessel and reduction of the processing quantity of the separated sludge are afforded.

In the case where the method of this invention is applied to the treatment of waste water containing harmful heavy metals, the harmful metal (M) (such as, for example, zinc, cadmium, and copper) is contained within the structure of a magnetic iron compound such as ferrite $[(Fe_2O_3.MO)_x$ $(Fe_2O_3.FeO)_y]$, and elution from the sludge does not occur readily, whereby the processing of the sludge is facilitated. Furthermore, organic materials occluded in the sludge are readily removable by heating, combustion, and other simple steps.

While the iron anode according to this invention is highly effective when utilized in occluding various impurities in a floc of iron hydroxide in the treatment of waste water containing these impurities, it can be utilized also in the treatment of waste water containing hexavalent chromium ions to reduce these ions to trivalent chromium ions. The trivalent chromium ions thus formed forms chromium hydroxide under neutral or alkaline conditions and assumes a floc state. This floc, together with the iron hydroxide floc, separates from the water phase. In the case where hexavalent chromium ions are reduced, oxidation processing of the floc thus formed is not necessary. However, oxidation processing is preferable for promoting dehydration and sedimentation of the formed floc.

For the treatment of waste water containing hexavalent chromium ions, the following two processes are known.

a. A chemical process which comprises adding to the waste water a chemical such as, for example, ferrous sulfate, which forms ferrous ions in water, adjusting the pH of the solution to 2 to 3 thereby to reduce the hexavalent chromium ions to trivalent chromium ions, thereafter adding an alkali such as calcium hydroxide thereby to adjust the pH of the waste water to an alkaline level and thereby to form a sediment, and removing the sediment.

b. An electrolysis process which comprises adjusting beforehand the pH of the waste water containing hexavalent chromium ions to 2 to 3, then carrying out electrolysis of the waste water with an iron plate used as the anode thereby to reduce the hexavalent chromium ions to trivalent chromium ions, adding an alkali thereby to adjust the pH of the waste water to an alkaline level and thereby to form a sediment, and removing the sediment.

In comparison with these known processes, the process with use of the iron anode according to this invention has the following advantage features.

1. Hexavalent chromium ions can be reduced electrically with an electric power consumption which is approximately 1/3 that required by the known electrolysis apparatus employing an iron plate as the anode, whereby great economy is afforded. While the reason for this feature is still not clear, it may be attributed to the use of the iron pieces as an auxiliary electrode, which iron pieces have a greatly increased electrode area in comparison with the iron plate of the prior art.

2. Since the floc is highly effective in intercepting chromium ions, chromium ions in a low concentration can be removed.

3. Reducing reaction can be carried out by electrolysis with high efficiency not only in an acidic region but also in a neutral region of solution. More specifically, in the case where the conventional iron plate is used as the anode, the reducing reaction rate is low because of the small surface area of the iron plate. Accordingly, it has been necessary to render the solution acidic in order to promote the reduction and thereafter to render the solution neutral or alkaline in order to transform the trivalent chromium ions into chromium hydroxide. According to this invention, however, reduction of the hexavalent chromium ions can be carried out efficiently under a neutral or alkaline condition without using an acidic condition.

When a floc containing impurities comprising iron hydroxide is subjected to oxidation processing, a magnetic iron compound (ferrite) is formed in this floc. Accordingly, in accordance with this invention in one aspect thereof, magnetic force is applied to this magnetic floc thereby to accelerate greatly the sedimentation of the floc. This magnetic force can be applied in the interior of the electrolytic cell or in a settling vessel in which the floc has been placed after being taken out of the electrolytic cell. In addition, it is also possible to apply the magnetic force in the step of taking the floc out of the electrolytic cell.

The magnetic flux density to be thus applied is of the order of 500 to 2,000 gausses.

Except for the use of an iron anode of the aforementioned construction and the subjecting the resulting floc to oxidation, which is not absolutely necessary in the reduction of hexavalent chromium ions, the method according to this invention is substantially the same as an electrolytic waste water treatment method in which a conventional iron anode or some other commonly used anode and cathode are used. In the conventional method, in order to render the waste water to be treated easy to electrolyze, it has been the practice in some cases to add thereto a suitable quantity of a suitable electrolyte such as, for example, an inorganic acid such as sulfuric acid or hydrochloric acid, an inorganic salt such as sodium chloride or sodium sulfate, or an alkali such as sodium hydroxide or calcium carbonate. This measure is desirable also in the practice of this invention.

Since, in the forming of the floc of iron hydroxide and chromium hydroxide, the waste water should be neutral or alkaline (of the order of pH 8), the electrolyte to be added is preferably a salt or an alkali. For promoting the sedimentation of suspension impurities, organic sedimentation promoters or flocculants comprising watersoluble polymers such as polyacrylamide and partial hydrolysis products thereof and inorganic sedimentation promoters such as aluminum sulfate for forming an inorganic floc such as aluminum hydroxide are known. It is also possible to add these promoters into the electrolytic cell of this invention or into a floc settling tank outside of the electrolytic cell.

The electrolysis treatment is ordinarily carried out at a temperature of the order of from 20° C to the boiling point of the waste water. In the case where it is desired to form ferrite in a short time by oxidation, this temperature is 50° C or higher, preferably above 60° C.

The invention will now be described with respect to one example of the method and apparatus according to this invention and with reference to the accompanying drawing.

Referring to FIG. 1, waste water from a storage tank 1 is sent by a pump 2 through a flowmeter 3 to an electrolytic cell 4, where the waste water is subjected to electrolysis. As a result, a floc is formed and is subjected to oxidation processing by a measure such as air bubbled thereinto through an inlet $c$ thereby to produce a magnetic iron compound. A high polymer flocculant such as polyacrylamide 5 is added, if necessary, to the water containing the floc which overflows out, and this water is sent through a magnet zone 6 and, after being thus magnetized, is sent to a sedimentation tank 7. In this sedimentation tank 7, the floc which has been magnetized and aggregated as a large mass rapidly settles and, at the same time, forms a sludge of low water content.

Depending on the circumstances, a magnet 6a may be installed at the bottom of the sedimentation tank 7, which thereby is made to function doubly as a sedimentation tank and as a magnet zone. The magnet may be a permanet magnet or it may be an electro-magnet. While the treatment conditions differ with the kind of waste water, the effect of magnetic sedimentation can be attained even by passing the waste water through magnetic field of, for example, 1,000 gausses for a period of from 1 to 2 seconds. The resulting sludge settles to the bottom of the sedimentation tank 7, from which cleaned water is discharged through an outlet $a$ and the sludge is discharged through an outlet $b$. Alternatively, it is also possible to drop magnets directly into the sedimentation tank, to attract the sludge onto the magnets, and to obtain cleaned water by lifting out the magnets. Some sludge may be formed within the electrolytic cell 4, and the sludge may be withdrawn from the outlet $d$ to the sedimentation tank 7 or to discarding.

Figure 2:
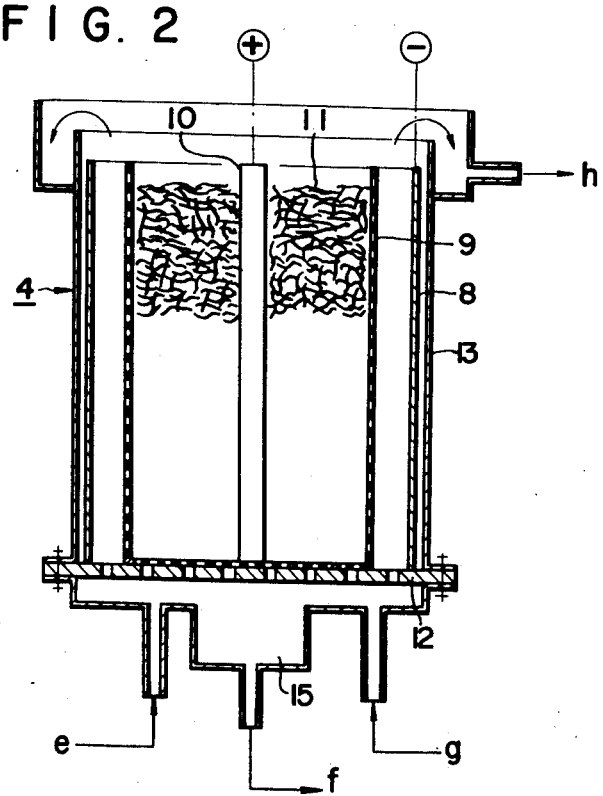
FIG. 2 is a diagrammatic elevation view, in vertical section, showing one example of an electrolytic cell for use in the practice of the method according to the invention.

The construction of the electrolytic cell 4 is shown in detail in FIG. 2. The essential parts of this electrolytic cell 4 are: a cylindrical cell vessel 13 having a vertical axis and having a bottom cover 14; a cylindrical cathode 8 which is made of a metal such as copper and has a diameter slightly less than that of the cell vessel 13, and which is disposed concentrically within the cell vessel 13; a cylindrical perforated diaphragm 9 of even smaller diameter made of a material such as a nylon net and disposed substantially concentrically within the cathode 8; an anode plate 10 made of a material such as platinum and disposed vertically at the center of the cell vessel 13; a body of iron turnings 11 packed in the space between the anode plate 10 and the diaphragm 9 and being in electrical contact with the anode plate 10; and a perforated bottom plate 12 disposed horizontally below the cathode 8, the diaphragm 9, and the anode plate 10, a bottom chamber 15 being formed between the bottom plate 12 and the bottom cover 14 of the cell vessel 13.

The cell vessel 13 is provided at its bottom cover 14 with an inlet $e$ for waste water to be treated an outlet $f$ for discharging sludge formed within the cell 4, and an inlet $g$ for bubbling in air and is provided at its upper part an overflow means $h$ comprising an overflow trough which is usually annular around the cell vessel 13 and an outlet for treated water, which overflows out of the cell vessel 13 into the overflow trough and travels through the outlet further to a sedimentation tank not shown.

The kinds of waste waters for which the waste water treatment method of this invention is suited are those containing, principally, such materials as precipitates, heavy metal ions, organic materials, particularly those in colloidal state, silica, iron powder, malodorous substances, and coloring matter. For example, the treatment method of this invention is effective for waste waters such as water containing emulsified cutting oil or machine oil, water containing rust-preventing agents such as $Cr^{6+}$ and $Zn^{2+}$, effluent from a plating process, malodorous effluent of sewage plumbing, effluent from ink production, effluent from a dyeing process, and effluent from a food processing plant.

In order to indicate still more fully the nature and utility of this invention, the following specific examples of practice and comparison examples are set forth it being understood that these examples are presented as illustrative only and that they are not intended to limit the scope of the invention.

The sedimentation tank to receive the treated water containing a floc is a conventional one in that it has a capacity large enough to hold the treated water for a residence time sufficient enough to cause complete setting of the floc except that it may upon necessity be provided with a magnet means at the bottom thereof. The tank has an outlet for the sludge.

Permanent magnet means or electric magnet means can be mounted on the outside or inside of a flowpath from the overflow means of the electrolytic cell to the sedimentation tank. Permanent magnet means or electric magnet means can also be mounted on the outside or inside of the bottom of the sedimentation tank.

In order to indicate still more fully the nature and utility of the invention, the following specific examples of practice constituting preferred embodiments thereof and results are set forth, it being understood that these examples are presented as illustrative only and that they are not intended to limit the scope of the invention.

EXAMPLES 1, 2, and 3

Into a cylindrical vessel made of an acrylic resin of 300-milliliter (ml.) capacity, a cylindrical nylon net structure of a height of 6 cm. was inserted to form a diaphragm. On the outer side of this nylon net, a cylindrical copper plate cathode of a surface area of 170 $cm^2$ was placed, and a platinum plate of a surface area of 12 $cm^2$ was suspended as an insoluble anode in the central part. 50 g. of iron turnings of lengths of from 5 to 10 mm., a total surface area being approximately 600 $cm^2$, were placed in the nylon net around the platinum plate thereby to form an auxiliary anode. Thus, an electrolytic cell was fabricated.

Into this electrolytic cell, 200 ml. of a solution (Solution 1) containing 1,200 ppm. of bivalent manganese ions was placed, and the pH of this solution was adjusted to 10 with caustic soda. Then, after this solution was heated to 60° C, a d-c voltage of 2 V was applied across the electrodes of the cell as air was bubbled into the solution at a rate of 6 liters/hr., and electrolysis was thus carried out with a current of 1 A until the coulometric concentration became 2.4 A.Hr./liter.

Thereafter, the solution was filtered to separate the sludge thus formed and the filtrate, and the bivalent manganese ion content of the filtrate thus obtained was measured by atomic obsorption spectrometry.

In a similar manner, a solution (Solution 2) containing 1,200 ppm. of bivalent copper ions instead of waste water containing bivalent manganese ions and a solution (Solution 3) containing 1,100 ppm. of bivalent zinc ions were treated according to procedure of Example 1, and the compositions of the sludges thus produced were measured. The results are shown in Table 1.

Table 1.

| Example No. | Solution No. | Concentration (ppm) of metal ions in filtrate | Composition (X-ray analysis) of sludge fired at 600° C |
|---|---|---|---|
| 1 | 1 | 1.2 | $(Mn_{0.983}Fe_{0.017})_2O_3 \cdot MnFe_2O_4$ |
| 2 | 2 | 0.026 | $CuFe_2O_4$ |
| 3 | 3 | 0.084 | $ZnFe_2O_4$ |

EXAMPLE 4

Into a cylindrical beaker of 300-ml. capacity, a cylindrical nylon net structure of a diameter of 5 cm. and a height of 6 cm. was inserted to constitute a diaphragm, around which a cylindrical copper plate cathode of 170-$cm^2$ surface area was placed, and a platinum plate of 12-$cm^2$ surface area was suspended as an insoluble anode in the central part. Around this platinum plate and in the nylon net, 50 g. of iron turnings of lengths of from 5 to 10 mm, total surface area of approximately 600$cm^2$, were placed. Thus, an electrolytic cell was fabricated.

In the vessel of this electrolytic cell, 200 ml. of a solution containing 100 ppm. of hexavalent chromium ions was placed, and 0.2 g. of sodium chloride was added thereto. Then, as air was bubbled at a rate of 6 liters/hr. into the solution, a d-c voltage of 8 V was applied across the two electrodes, and electrolysis was carried out with a current of 1A until the coulometric concentration amounted to 0.3 A.hr./liter.

Thereafter, the resulting electrolyte was separated by filtration into a sludge, which was of black-brown color and was magnetic, and a filtrate. The chromium ion content of this filtrate was measured and found to be less than 0.01 ppm. One hand, the sludge thus filtered out was left standing for 24 hours in air at room temperature. 0.5 g. of this sludge was sampled and suspended in 20 ml. of pure water and was shaken for 6 hours at room temperature. Thereafter, the resulting liquid was again filtered and thus separated into a sludge and a filtrate. The metal ion content of this filtrate was measured by atomic absorption spectrum analysis and was found to be less than 0.1 ppm.

COMPARISON EXAMPLE 1

For comparison, a cylindrical nylon net structure of 5-cm. diameter and 6-cm. height was inserted into and thus used as a diaphragm in a cylindrical beaker of 300-ml. volumetric capacity. Around this diaphragm, a cylindrical copper cathode of a surface area of 170 cm$^2$ was placed, and a rectangular iron plate of a surface area of 48 cm$^2$ was suspended as an anode on the inner side of the nylon net. 200 ml. of waste water containing 100 ppm of hexavalent chromium ions was placed in the electrolytic cell thus prepared, and electrolysis was carried out without bubbling in of air until the coulometric concentration amounted to 0.3 A.hr./liter.

Thereafter, the resulting electrolyte was separated by filtration into a sludge, the sedimentation volume of which was found to be approximately 5 times that in the case of Example 4, and a filtrate. The sludge thus obtained was left standing for 24 hours in air at room temperature. Then 0.5 g of this sludge was sampled and suspended in 20 ml. of pure water and was shaken for 6 hours at room temperature. The resulting liquid was then filtered and again separated into sludge and a filtrate. The metal ion content of this filtrate was measured and found to be 2.45 ppm.

COMPARISON EXAMPLE 2

Except for the use of a solution containing 100 ppm. of bivalent zinc ions instead of the solution containing chromium ions in Comparison Example 1, the procedure specified in Comparison Example 1 was followed in subjecting the solution to electrolysis treatment. The solution thus treated was then filtered, and the sludge thus obtained was left standing for 24 hours at room temperature. 0.5 g. of this sludge was then sampled and suspended in 20 ml. of pure water. This suspension was shaken for 6 hours at room temperature and then separated by filtration again into a sludge and a filtrate. The metal ion content of this filtrate was measured and found to be 36.3 ppm.

EXAMPLE 5

Into a beaker of 300-ml. capacity, a cylindrical nylon net structure of 5-cm. diameter and 6-cm. height was inserted as a diaphragm, and a cylindrical copper plate cathode of a surface area of 170 cm$^2$ was placed on the outer side of this diaphragm. A platinum plate of 12-cm$^2$ surface area was suspended in the center of the diaphragm, and 50 g. of iron turnings of lengths of from 5 to 10 mm., a sum total surface area being approximately 600 cm$^2$, were placed as an auxiliary electrode in the nylon net around the platinum plate. Thus, an electrolytic cell was fabricated.

Into this electrolytic cell, 200 ml. of a solution containing sodium dichromate, a hexavalent chromium ion concentration being 100 ppm, and adjusted to a pH of approximately 7 was placed, and 0.2 g. of sodium chloride was added. Then, after the solution was heated to 60° C, and as air was bubbled thereinto at a rate of 6 liters/hr., a d-c voltage of 3V was applied across the electrodes. Thus, electrolysis was carried out and floc was found with a current of 1A for 72 seconds until the coulometric concentration amounted to 0.1 A.hr./liter.

Thereafter, the solution was filtered and thereby separated into a sediment (sludge) and a filtrate. The total chromium ion content in this filtrate was measured by the atomic absorptiometric method and found to be less than 0.1 ppm.

EXAMPLE 6

200 ml. of a solution of sodium dichromate, a hexavalent chromium ion concentration being 200 ppm., adjusted to a pH of approximately 7 was placed in the electrolytic cell used in Example 5, and 0.2 g. of sodium chloride was added thereto. Then, after the solution was heated to 60° C, and as air was bubbled thereinto at a rate of 6 liters/hr., a d-c voltage of 3V was applied across the terminals, and thus electrolysis was carried out with a current of 1 A for 288 seconds until the coulometric concentration amounted 0.4 A.hr./liter.

The resulting liquid was thereafter filtered and thus separated into a sediment and a filtrate. The total chromium ion content in this filtrate was measured and found to be less than 0.1 ppm.

EXAMPLE 7

200 ml. of a solution of sodium dichromate, a hexavalent chromium concentration being 100 ppm., adjusted to a pH of 3 was placed in the electrolytic cell used in Example 5, and 0.2 g. of sodium chloride added thereto. Then, without heating of the solution, a d-c. voltage of 3V was applied across the electrodes as air was bubbled into the solution at a rate of 6 liters/hr. Thus, electrolysis was carried out with a current of 1A. until the coulometric concentration amounted 0.1 A.hr./liter.

Thereafter, the resulting liquid was separated by filtration into a sediment and a filtrate. The total chromium ion content in this filtrate was measured and found to be less 0.1 ppm.

COMPARISON EXAMPLE 3

A cylindrical copper plate cathode of a surface area of 170 cm$^2$ was placed in beaker of 300-ml. capacity, and within this cathode, a cylindrical platinum anode of 118-cm$^2$ surface area was installed. In the electrolytic cell thus fabricated, 200 ml. of a solution of sodium dichromate, a hexavalent chromium ion concentration being 100 ppm., of a pH of approximately 7 was placed, and 0.2g. of sodium was added thereto. The liquid was then heated to 60° C.

Thereafter, as air was bubbled at a rate of 6 liters/hr. into the liquid, a d-c voltage of 10V was applied across the electrodes, and electrolysis was thus carried out with a current of 1A. until the coulometric caoncentration amounted to 0.1 A.hr./liter. The liquid was then separated by filtration into a sediment and a filtrate. The total chromium ion content of this filtrate was measured and found to be 96.3 ppm.

From this result, and the result of Example 5, it can be seen that the iron turnings constituting an auxiliary electrode has a great effect on the removal of hexavalent chromium ions.

COMPARISON EXAMPLE 4

A cylindrical nylon net structure of 5-cm. diameter and 6-cm. height was inserted into a beaker of 300-ml. capacity to form a diaphragm. A circular copper plate cathode of a surface area of 170 cm$^2$ was placed on the outside of the diaphragm, and a rectangular iron plate of a surface area of 48 cm$^2$ was suspended on the inner side of the nylon net structure to form an anode. In the electrolytic cell thus fabricated, 200 ml. of a solution containing a sodium dichromate solution, a hexavalent chromium ion concentration of 100 ppm., adjusted to a pH of approximately 7 was placed, and 0.2 g. of sodium chloride was added thereto. The liquid was then heated to 60° C.

Thereafter, as air was bubbled at a rate of 6 liters/hr. into the liquid, a d-c voltage of 10 V was applied across the electrodes, and electrolysis was thus carried out with a current of 0.4 A. until the coulometric concentration amounted to 0.1 A.hr./liter. The resulting liquid was then filtered to separate it into a sediment and a filtrate. The total chromium ion content of this filtrate was measured and found to be 62 ppm.

COMPARISON EXAMPLE 5

By the procedure set forth in Comparison Example 4, except for a coulometric concentration of 0.31 A.hr./liter instead of 0.1 A.hr./liter, a solution containing chromium of the same concentration was electrolytically treated under the same conditions. The total chromium ion content in the filtrate was found to be 0.41 ppm.

As is apparent from the results of the above described Example 5 and Comparison Examples 4 and 5, it is possible by the method of this invention to treat waste water containing hexavalent chromium ions with less electrical energy than that required in a conventional electrolysis, that is, with electrical energy which is approximately ⅓ that in the known method.

EXAMPLE 8

Each of four samples of waste waters of pH of 1.8 resulting from washing with water of metal after surface treatment and respectively containing metal ions of the various kinds set forth in Table 2 was adjusted with caustic soda to a pH of 7. 200 ml. of each sample thus adjusted was placed in the electrolytic cell used in Example 5 and heated to 60° C. Then, as air was bubbled at a rate of 6.5 liters/hr. into waste water, a d-c voltage of 2.5 V was applied across the electrodes, and electrolysis was carried out with a current of 1A until the coulometric concentration amounted to 0.2 A-hr./liter.

Thereafter, each liquid thus obtained was filtered and thereby separated into a black sediment and a filtrate. The residual metal ion concentration in each filtrate was measured and found to be as set forth in Table 2.

Table 2

| Waste water | | Filtrate | |
|---|---|---|---|
| Metal ion | Content (ppm) | Metal ion | Content (ppm) |
| $Cu^{++}$ | 130 | $Cu^{++}$ | 0.1 |
| $Zn^{++}$ | 194 | $Zn^{++}$ | 0.1 |
| $Fe^{+++}$ | 14.4 | $Fe^{+++}$ | 0.07 |
| $Pb^{++}$ | 4.3 | $Pb^{++}$ | 0.05 |

EXAMPLE 9

200 ml. of a liquid stock resulting from the cooking of octapus, which is of a pH of 7 and having a COD of 100 ppm. was placed in the electrolytic cell used in Example 5 and was subjected to electrolysis at room temperature with a current of 1A. by applying a d-c voltage of 3V between the electrodes as air was bubbled at a rate of 6 liter/hr. into the liquid until the coulometric concentration amounted to 0.5 A.hr./liter.

Thereafter, the liquid was separated by filtration into a sediment and a filtrate. The COD in this filtrate was measured and found to be 3.0 ppm.

Furthermore, the sediment was dried and left standing in a constant-temperature chamber for 48 hours for drying. Thereafter, the structure of the sediment thus dried was ahalyzed with X-rays and found to be $Fe_3O_4$.

EXAMPLE 10

200 ml. of a liquid stock resulting from the cooking of whale bacon of a pH of 7 and a COD of 12,600 ppm. was placed in the electrolytic cell used in Example 5.

Then electrolysis of the liquid was carried out at room temperature by applying a d-c voltage of 5V across the electrodes with a current of 1 A until the coulometric concentration amounted to 1 A. hr./liter.

Thereafter, the liquid was filtered and thereby separated into a sediment and a filtrate. The COD of this filtrate was measured and found to be 130 ppm.

EXAMPLE 11

200 ml. of waste water containing 1,000 ppm. of a cutting oil produced by Mitsubishi Sekiyu, K.K. Japan, was placed in the electrolytic cell used in Example 5 and was subjected to electrolysis at a room temperature with a d-c voltage of 5 V applied across the electrodes and with a current of 1 A. until the coulometric concentration amounted to 0.1 A.hr./liter.

Thereafter, the resulting liquid was separated by filtration into a sediment and a filtrate. The TOD (total oxygen demand) value of the cutting oil in this filtrate was measured and found to be 43 ppm. The TOD value of the original waste water was 3,780 ppm.

EXAMPLE 12

Into a cylindrical vessel made of an acrylic resin of a 6-cm. diameter and 20-cm height, a nylon net structure of cylindrical shape of 5-cm diameter and 6-cm height was inserted to form a diaphragm. On the outer side of this nylon net, a cylindrical copper plate cathode of a surface area of $170 cm^2$ was placed, and a platinum plate of a surface area of $12 cm^2$ was suspended in the central part. 50 grams (g.) of iron turnings of lengths of from 5 to 10 mm. were placed in the nylon net around the platinum plate to be used as the anode thereby to fabricate an electrolytic cell.

From the lower part of this electrylic cell, water containing 1,000 ppm. of milk and 1,000 ppm. of NaCl as an electrolyte, chemical oxygen demand (COD) value being 490 ppm., was supplied at a rate of 1.2 liters/hour. Simultaneously, air was bubbled at a rate of 6 liters/hour into the electrolytic cell, and a d-c voltage of 10V was applied between the anode and the cathode to cause a current of 1A to flow and carry out continuous electrolytic treatment of the water. The coulometric concentration (i.e., electrical energy passed per unit volume of the liquid treated) at this time was 0.8 A.hr./liter.

The process liquid flowing out from the upper part of this electrolytic cell was conducted through a pipe to which a magnetic field of 500 gausses was applied to a settling vessel, where floc was caused to settle, and, at the same time, the supernatant was caused to flow out of the upper part of the setting vessel. The COD value of the supernatant was found to be 290 ppm. (COD reduction: 41%), and the turbidity was zero (on the basis of kaolin as reference).

The resulting sludge containing the floc was dried at 100° C and was analized by X-ray diffraction, whereupon it was found that $Fe_3O_4$ had been formed.

In a similar experiment with a coulometric concentration of 5 A.hr./liter, the COD reduction was 63 percent.

COMPARISON EXAMPLES 6 and 7

A liquid containing milk was treated by the procedure specified in Example 1 except that air was not bubbled into the electrolytic cell. As a result, it was found that the settling speed of the floc was approximately 1/40 of that in Example 1, while the settling volume was approximately 5 times that in Example 1. The turbidity of the supernatant was 100 ppm.

Furthermore, when, in the procedure of Example 1, the magnetic field was not applied, the settling speed decreased to approximately 1/40.

COMPARISON EXAMPLE 8

A liquid containing milk was treated by the procedure set forth in Example 1 except for the use of an aluminum plate in place of the iron turnings for the anode. As a result, the COD reduction was found to be 20 percent when the coulometric concentration was 0.8 A.hr./liter and to be 28 percent when the coulometic concentration was 5 A.hr./liter.

When aluminum turnings were used, oxide film was formed on the surface thereof with the passage of time, and a great decrease in the current value occurred (0.5 A. after 10 minutes, and 0.2A after 40 minutes).

EXAMPLE 13

With the use of apparatis similar to that specified in Example 1, waste water containing 5 ppm. of $Cr^{6+}$ (liquid pH of 6.9, resistivity of 860 ohm.cm) was treated at a flow rate of 6 liters/hr. in a vessel with a d-c voltage of 5V. and a current of 1.0 A., while air was bubbled thereinto. As a result, with a coulometric concentration of 0.08 A.hr./liter, the $Cr^{6+}$ content decreased to less than 0.01 ppm. The corresponding removal rate was 99.8 percent, and it was possible to magnetic process the magnetic iron compounds formed.

When the same treatment was carried out with respect to waste water containing $Zn^{2+}$, an equivalent process effectiveness was attained.

EXAMPLE 14

By the procedure set forth in Example 2, except for the use of a solution containing 100 ppm. of bivalent zinc instead of the solution containing chromium ions, the solution was subjected to electrolysis treatment and then filtered. The sludge thus obtained was left standing for 24 hours at room temperature, and then 0.5 g. thereof was sampled and suspended in 20 ml. of pure water. This suspension was shaken for 6 hours at room temperature and thereafter separated again by filtration into a sludge and a filtrate. The metal ion content of the filtrate thus obtained was measured and found to be 0.5 ppm.

We claim:

1. In the treatment of waste water which comprises subjecting the waste water to electrolysis with iron as anode thereby to cause impurities in the waste water to aggregate within a floc resulting from the formation of iron hydroxide by electrolytic dissolution of the anode and separating the floc containing the impurities from the waste water, the improvement wherein the iron anode comprises an insoluble electrode material and a body of iron pieces in electrical contact therewith, and the floc containing the impurities is subjected to oxidation processing thereby to convert the iron hydroxide into a magnetic iron compound.

2. The improvement as claimed in claim 1 in which the group of iron pieces is confined within a chamber defined by a material which has perforations of a nature whereby it will pass ions but not the iron pieces therethrough, and which will remain intact under the electrolysis and thus constitutes the iron anode.

3. The improvement as claimed in claim 1 in which the electrolysis is carried out at a temperature of from 10° C to the boiling point of the waste water.

4. The improvement as claimed in claim 1 in which the oxidation processing comprises causing the floc to contact molecular oxygen.

5. The improvement as claimed in claim 4 in which the molecular oxygen is air.

6. The improvement as claimed in claim 1 in which the oxidation processing is accomplished in a vessel wherein the electrolysis is being carried out.

7. The improvement as claimed in claim 1 in which a magnetic field is applied to the floc in which a magnetic iron compound has been produced thereby to promote aggregation of the floc.

8. The improvement as claimed in claim 1 in which the total surface area of the body of iron pieces is greater than 0.5 $cm^2$/milliliter with respect to the actual volumetric capacity of a cell in which the electrolysis is carried out.

9. The improvement as claimed in claim 1 in which the body of the iron pieces has therewithin a void percentage of from 50 to 99 percent.

10. In the treatment of waste water containing hexavalent chromium ions which comprises subjecting the waste water to electrolysis with iron as anode thereby to reduce the hexavalent chromium ions to chromium ions of lower valence and to cause the chromium ions of lower valence to be collected by a hydroxide of iron formed from the anode by the electrolysis and separating the resulting floc containing the chromium from the waste water, the improvement wherein the anode of iron comprises an insoluble electrode and a body of iron pieces in electrical contact therewith.

11. The improvement as claimed in claim 10 in which the electrolysis is carried out at a temperature of from 60° C to the boiling point of the waste water.

12. The improvement as claimed in claim 10 in which the floc containing the lower valence chromium is subjected to oxidation processing thereby to produce a magnetic iron compound within the floc.

13. The improvement as claimed in claim 12 in which the oxidation processing is accomplished by bubbling air into a vessel wherein the electrolysis is being carried out.

* * * * *